United States Patent

Lardy et al.

Patent Number: 5,655,991
Date of Patent: Aug. 12, 1997

[54] PROCESS AND APPARATUS FOR CONTROLLING A CONTINUOUSLY VARIABLE SPEED TRANSMISSION

[75] Inventors: Patric Lardy, Weil der Stadt; Willi Seidel, Eberdingen; Joseph Petersmann, Wimsheim, all of Germany

[73] Assignee: Dr. Ing. h.c.F. Porsche AG, Germany

[21] Appl. No.: 418,613

[22] Filed: Apr. 7, 1995

[30] Foreign Application Priority Data

Apr. 7, 1994 [DE] Germany .................. 44 11 938.0

[51] Int. Cl.⁶ ............................................. B60K 41/16
[52] U.S. Cl. .................... 477/46; 477/37; 477/48
[58] Field of Search ....................... 477/37, 44, 46, 477/48, 904; 364/424.1

[56] References Cited

U.S. PATENT DOCUMENTS

| | | | |
|---|---|---|---|
| 4,658,360 | 4/1987 | Osanai et al. | 364/424.1 |
| 4,689,745 | 8/1987 | Itoh et al. | 364/424.1 |
| 4,711,333 | 12/1987 | Okamura | 477/44 |
| 4,735,112 | 4/1988 | Osanai et al. | |
| 4,735,114 | 4/1988 | Satoh et al. | |
| 4,788,892 | 12/1988 | Komoda et al. | |
| 4,833,944 | 5/1989 | Tanaka | |
| 5,119,298 | 6/1992 | Naito | 364/426.02 |
| 5,364,321 | 11/1994 | Togai et al. | 477/42 |
| 5,368,530 | 11/1994 | Sanematsu et al. | 477/43 |
| 5,433,677 | 7/1995 | Petersmann et al. | 477/169 |
| 5,527,232 | 6/1996 | Seidel et al. | 477/46 |

FOREIGN PATENT DOCUMENTS 42 39 133C1  12/1993  Germany .

*Primary Examiner*—Rodney H. Bonck
*Assistant Examiner*—Peter T. Kwon
*Attorney, Agent, or Firm*—Evenson, McKeown, Edwards & Lenahan P.L.L.C.

[57] ABSTRACT

The invention provides a method and apparatus for controlling a continuously variable speed transmission of a motor vehicle driven by an internal-combustion engine, by means of a control arrangement having a selecting device which simulates a stepped transmission by adjusting transmission ratios in according to a group of preset transmission ratios. To prevent repeated up and down shifting, a control arrangement is provided with a unit for detecting driving situations in which a transmission ratio shift according to the preset transmission rations would be too large, and also a unit for adjusting the preset transmission ratio. The recognition unit activates the adjustment unit as soon as the above-described driving situation occurs, and the adjustment unit then changes a preset transmission ratio so that the motive force is adapted to the present motive resistance, allowing the vehicle to achieve a positive longitudinal acceleration.

22 Claims, 5 Drawing Sheets

PROCESS AND APPARATUS FOR CONTROLLING A CONTINUOUSLY VARIABLE SPEED TRANSMISSION

BACKGROUND AND SUMMARY OF THE INVENTION

This invention relates to a method and apparatus for controlling a continuously variable speed transmission.

In known stepped transmissions, only fixed transmission ratio jumps are possible. However, in order to determine transmission ratio shifts, it is important to know whether the driving takes place uphill or downhill, loaded or empty. Thus, a transmission shift from the third into the fourth gear, which can easily be driven in a level plane, may be much too large on a corresponding incline. This leads to a situation in which the vehicle can accelerate in the third gear to the maximal rotational speed of the driving engine, but can then no longer maintain the achieved speed in the fourth gear. In the case of automatically shifting stepped transmissions, this results in repeated shifting (in the indicated example, between the third and the fourth gear) which can be avoided only by manually selecting a particular gear (in the indicated example, the third gear), using a selector lever.

For continuously variable transmissions, it is known from German Patent Document DE-A1 41 20 540 to simulate a stepped transmission in that fixed transmission ratios are defined. In addition, it is known from German Patent Document DE-A1 42 39 133 to simulate a stepped automatic device by means of a continuously variable transmission also while defining fixed ratios. The above-mentioned problems also occur in this case.

In is an object of the present invention to provide a control arrangement for a continuously variable automatic vehicle transmission which avoids the problem of repeated shifting, without the need for driver intervention by way of the shift selector level.

This object is achieved according to the present invention by including in the control arrangement for continuously variable transmission, a unit for detecting driving situations in which a prospective transmission ratio shift is too large, and a unit for adjusting the preset ratio. The recognition unit activates the adjustment unit as soon as the above-described driving situation (in which repeated, or "pendulum shifting" may occur) is reached. The adjustment unit then changes a preset ratio such that the motive force is adjusted to the present motive resistance; that is, the vehicle can achieve a positive longitudinal acceleration. As a result, advantageously (particularly in the case of an automatic transmission), pendulum shifting is avoided. In the case of manually shifting transmissions, in special driving situations, the transmission ratio is adapted to the existing operating conditions of the vehicle without any resulting loss of the typical characteristics of a stepped transmission.

In a first embodiment of the invention, the recognition unit will recognize if, because of an insufficient amount of motive force, a shift occurs from a preset transmission ratio to a next higher preset transmission ratio (corresponding to a backshift in the case of a stepped transmission). As an indication of an insufficient amount of motive force, the recognition unit preferably determines whether simultaneously a throttle valve position is larger than a limit value and a longitudinal acceleration is less than zero. This type of recognition has the advantage that the intervention takes place only when it is no longer possible to follow the automatic control or the driver's wish.

As soon as an upper engine speed limit is reached, the above embodiment of the adjustment unit changes the transmission ratio so that the rotational transmission input speed is kept constant. As a result, by adjustment of the transmission ratio, the motive force is adapted to the presently existing motive resistance. When the difference between the presently adjusted transmission ratio and the next lower transmission ratio reaches a defined limit value, an upshift is initiated. Thus, despite the adjustment of the transmission ratio, the character of a stepped transmission is maintained.

A second embodiment of the adjustment unit changes the transmission ratio in the described manner until a surplus, or reserve, of motive force exists at the next lower ratio (corresponding to a next higher gear in the case of a stepped transmission).

A third embodiment of the adjustment unit becomes operative before the change to the next higher transmission ratio. From the start, the next higher transmission ratio is determined and adjusted so that a preset margin is maintained between the current rotational speed of the driving engine and its maximum rotational speed. The size of this rotational speed margin is preferably determined as a percentage of the rotational speed jump in the case of the intended change of the transmission ratio and, in this case, may assume values of, for example, between 25% and 50%. It is also an advantage for the rotational speed margin to be determined such that a motive force reserve will always exist. This construction maintains the constancy of a once-adjusted transmission ratio as a typical characteristic of a stepped transmission.

A second embodiment of the recognition unit is based on the determination of a motive force reserve in the next higher gear before this gear is shifted. This determination of the motive force reserve may be made in a known manner, for example, by means of a table, based on the present throttle valve position and the rotational engine speed occurring in the next higher gear. If this value is zero or negative, the transmission ratio may be adjusted correspondingly, even before a shifting operation.

An appropriate adjustment unit is constructed such that a change of ratio is first suppressed. That is, when the driving engine reaches an upper rotational speed limit, the transmission ratio is changed so that the rotational transmission input speed remains constant. This adjustment of the ratio is carried out until a motive force reserve exists at the new lower ratio (corresponding to the next higher gear in the stepped transmission). This embodiment reduces the transmission ratio adjustment to the minimum necessary, and the character of a stepped transmission is also maintained.

A second embodiment of the adjustment unit will now not affect the present gear; rather, the transmission ratio adjustment at the next lower ratio is altered before a change thereto to such an extent that a motive force reserve exists there. In this case also, a transmission ratio adjustment takes place only to the extent absolutely necessary, and the character of a stepped transmission is maintained because no adjustment is carried out on the currently selected transmission ratio.

The described recognition units are advantageously constructed as part of a microprocessor-driven control unit. Of course, they may also be implemented by discrete comparators, such as differential amplifiers, in which case a first comparator is provided for the throttle valve position; a second comparator is provided for longitudinal acceleration; and a third comparator is provided for rotational engine speed. In this case, the first comparator compares the throttle valve position with a lower limit value; the second comparator compares the longitudinal acceleration with the maximum value zero; and the third comparator compares the rotational engine speed with a maximum value. The comparators each emit a signal when the comparison discloses identify of input values.

The above-described effects and advantages apply to a manually shifted transmission as well as to an automatically shifted simulation of a stepped transmission by means of a continuously variable transmission. Analogously, they also apply to the process according to the invention.

Other objects, advantages and novel features of the present invention will become apparent from the following detailed description of the invention when considered in conjunction with the accompanying drawings.

DETAILED DESCRIPTION OF THE DRAWINGS

Figure 1:
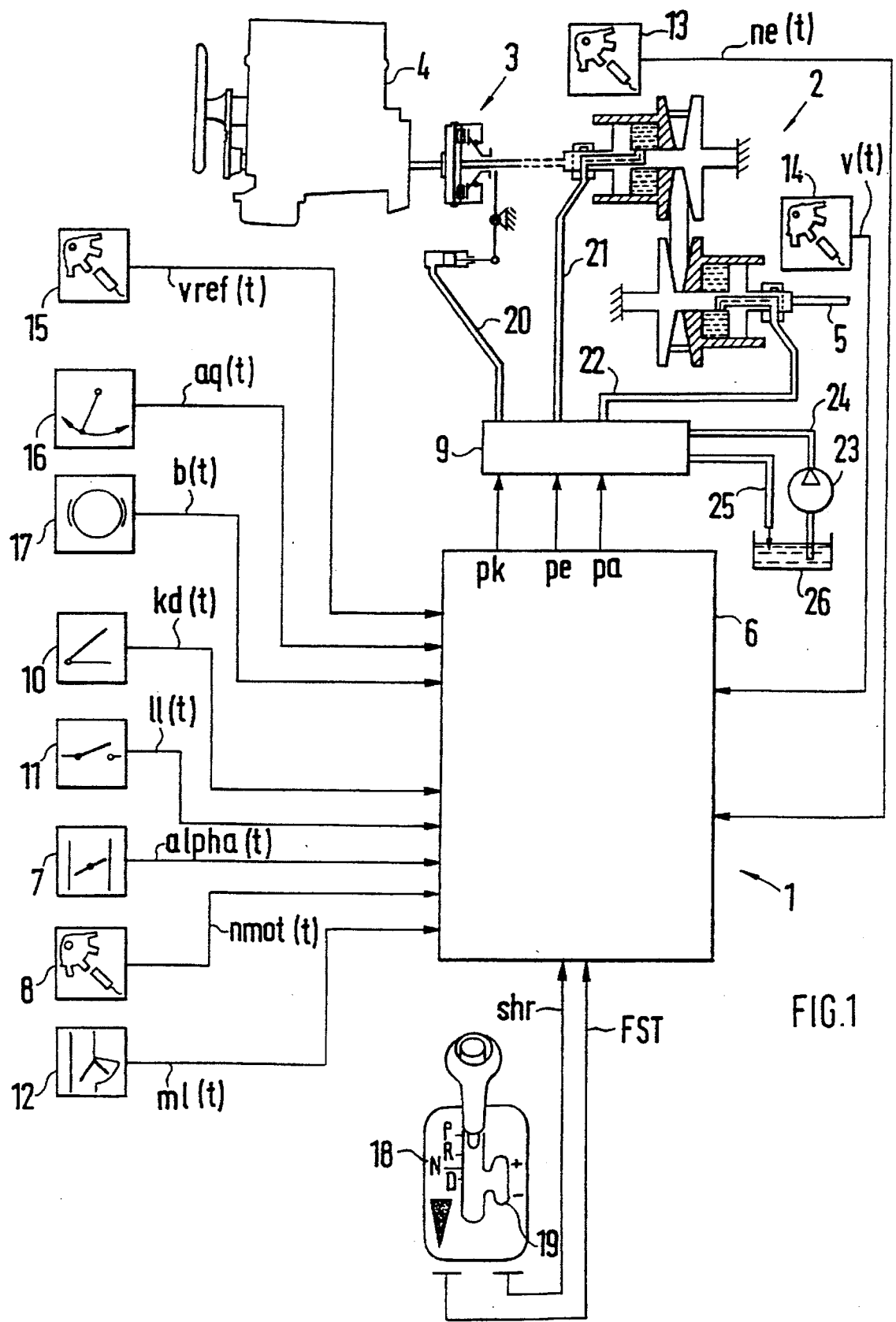
FIG. 1 is schematic depiction of a continuously variable transmission with a control.

FIG. 1 shows an electrohydraulically actuated continuously variable transmission 2 with a control 1 arranged, for example, as a wind-around transmission. The continuously variable transmission 2 is driven by an internal-combustion engine 4, by means of a controllable starting clutch 3. An output shaft 5 of the continuously variable transmission 2 is connected with a drive wheel of a motor vehicle (not shown).

Quantities or functions which change with the time t are indicated in the following as functions f(t) of the time t.

A control unit 6 controls a hydraulic valve block 9 at least as a function of the throttle valve position alpha(t) determined by a throttle valve angle generator 7, and of a rotational engine speed nmot(t) determined by a rotational engine speed generator 8 of the internal-combustion engine. For control of the continuously variable transmission 2 and of the starting clutch 3, the control unit 6 receives, as additional input quantities, a kick-down signal kd(t) of a kick-down switch 10, an idling signal 11(t) of an idling switch 11, a quantity or air mass ml(t) of a quantity or mass air flow sensor 12 of the internal-combustion engine 4 as well as a rotational transmission input speed ne(t) determined by a rotational transmission input speed generator 13 and a driving speed v(t) determined by a driving speed generator 14. When the starting clutch is engaged, the rotational transmission input speed ne(t) corresponds to the rotational engine speed nmot(t) and can then be used in its place. In addition, the control unit 6 detects and processes a speed signal vref(t) of a reference speed generator 15 on a non-powered vehicle axle, a lateral acceleration aq(t) of a lateral acceleration generator 16 and a brake signal b(t) of a brake signal generator 17.

Finally, the control can also be manipulated by the vehicle driver by way of a selecting device 18 for preselecting the driving positions P (parking position), R (reverse gear position), N (idling gear position) and D (automatic adjustment of the ratio of the continuously variable transmission). In addition, an adjusting range of the selecting device 18 is provided for the direct presetting of the ratio.

The selecting device 18 may be moved from the driving position D into a second shifting channel 19 in which, starting out from a central inoperative position, the selecting device 18 operates as a toggle switch. In this manner, the vehicle driver can control the transmission ratio in the sense of an upshift or a backshift. The selecting device 18 emits a driving position signal FST and a shift request signal shr for an upshift or a backshift.

Herein the terms "upshift" and "reduction of the ratio" are used to designate a change of the transmission ratio which increases the rotational output speed of the transmission while the rotational input speed remains the same, corresponding to an upshift in the case of a stepped transmission. Inversely, the terms "downshift" or "increase of the ratio" will indicate a change of the transmission ratio in the sense of a reduction of the rotational output speed of the transmission while the rotational input speed remains the same, corresponding to a downshift in the case of a stepped transmission.

As a function of the above-mentioned quantities, the control unit 6 generates a signal output pk, which controls the valve block 9, and thereby the hydraulic pressure in the starting clutch 3. It also generates signal outputs pe and pa, which likewise operate on the hydraulic valve block 9 to control the actual transmission ratio ue between the rotational transmission input speed ne(t) and the rotational transmission output speed (driving speed) v(t). For this purpose, the hydraulic valve block 9 connects corresponding control lines 20, 21, and 22 of the starting clutch 3 and of the continuously variable transmission 2 with a pressure line 24 connected to a pump 23 or a return flow line 25 to a storage tank 26 for hydraulic liquid.

Figure 2:
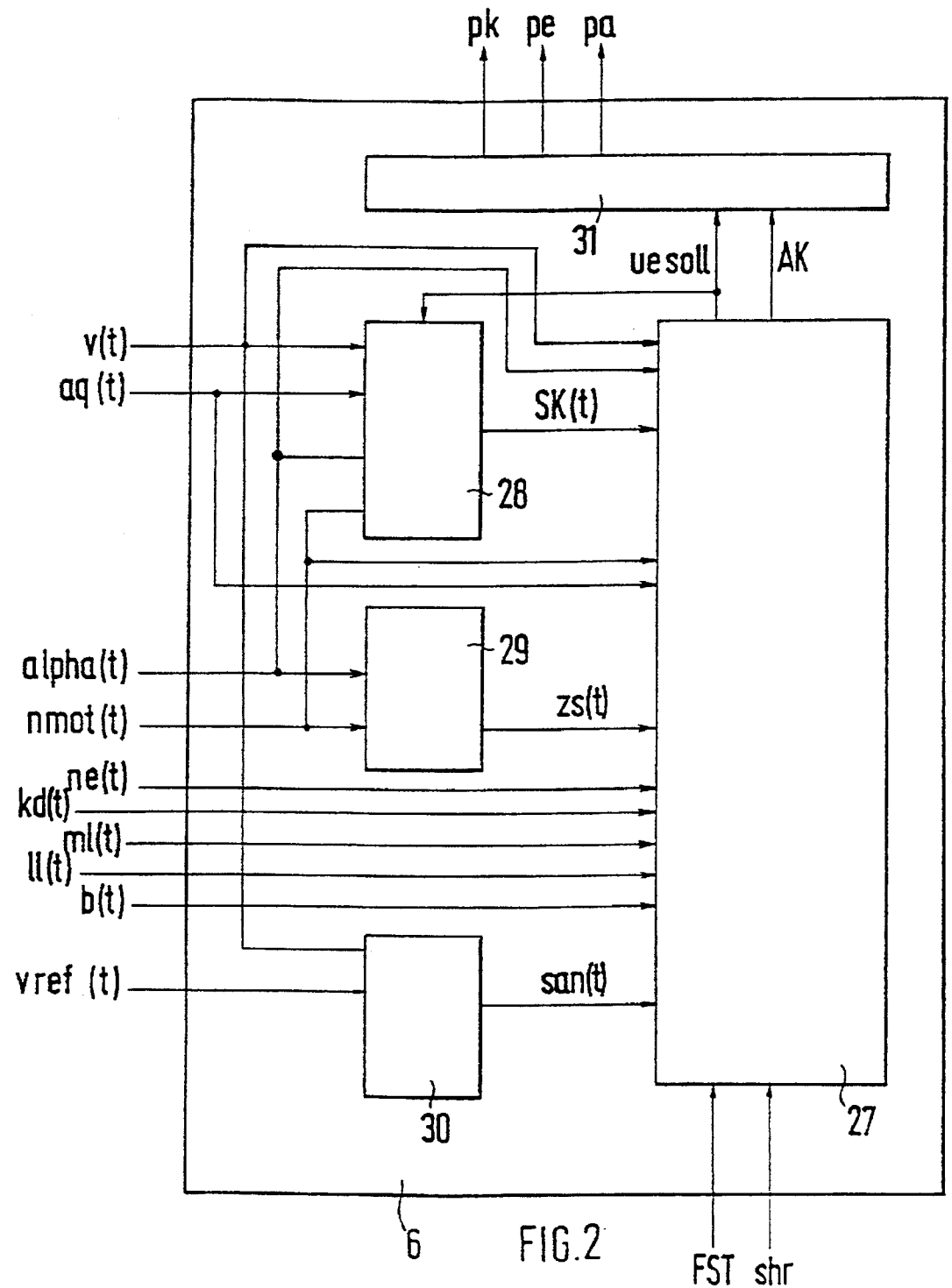
FIG. 2 is a block diagram of a transmission ratio control.

As illustrated in FIG. 2, the control unit 6 comprises a transmission ratio control 27 which is connected with a driving activity determination unit 28, a drive/coasting determination unit 29, a wheel slip determination unit 30 and an adjusting unit 31. The driving activity determination unit 28 determines a driving activity SK(t) quantity, which evaluates the driver's driving style or his action caused by the traffic situation relative to the control of the motor vehicle in a known manner (preferably according to a process described in German Patent Document DE-A1 39 22 051).

As a function of the throttle valve position alpha(t) and of the rotational engine speed nmot(t), the drive-coasting determination unit 29 emits a drive/coasting signal zs(t) indicative of drive or coasting operation of the vehicle, and the wheel slip determination unit 30, generates a wheel slip san(t) which represents the slip of the driven wheels, based on a difference of the driving speed v(t) and the reference vehicle speed vref(t).

Based on the driving position signal FST, the shifting request signal shr, the throttle valve position alpha(t), the kick-down signal kd(t), the idling signal 11(t), the air mass ml(t), the rotational transmission input signal ne(t), the driving speed v(t), the lateral acceleration aq(t), the brake signal b(t), and the rotational transmission output signal ne(t), the transmission ratio control 27 determines a desired transmission ratio ($ue_{des}$) and a starting clutch disengaged/engaged signal AK, which are transmitted to the adjusting unit 31.

The adjusting unit 31 generates the signal outputs pe and pa to control the adjustment of the actual transmission ratio ue of the transmission 2, and the desired transmission ratio $ue_{des}$ is adjusted with the shortest possible delay time but without any noticeable overshooting. Furthermore, the driving clutch is controlled according to the starting clutch disengaged/engaged signal AK by the adjusting unit 31 by way of the signal output pk.

Figure 3:
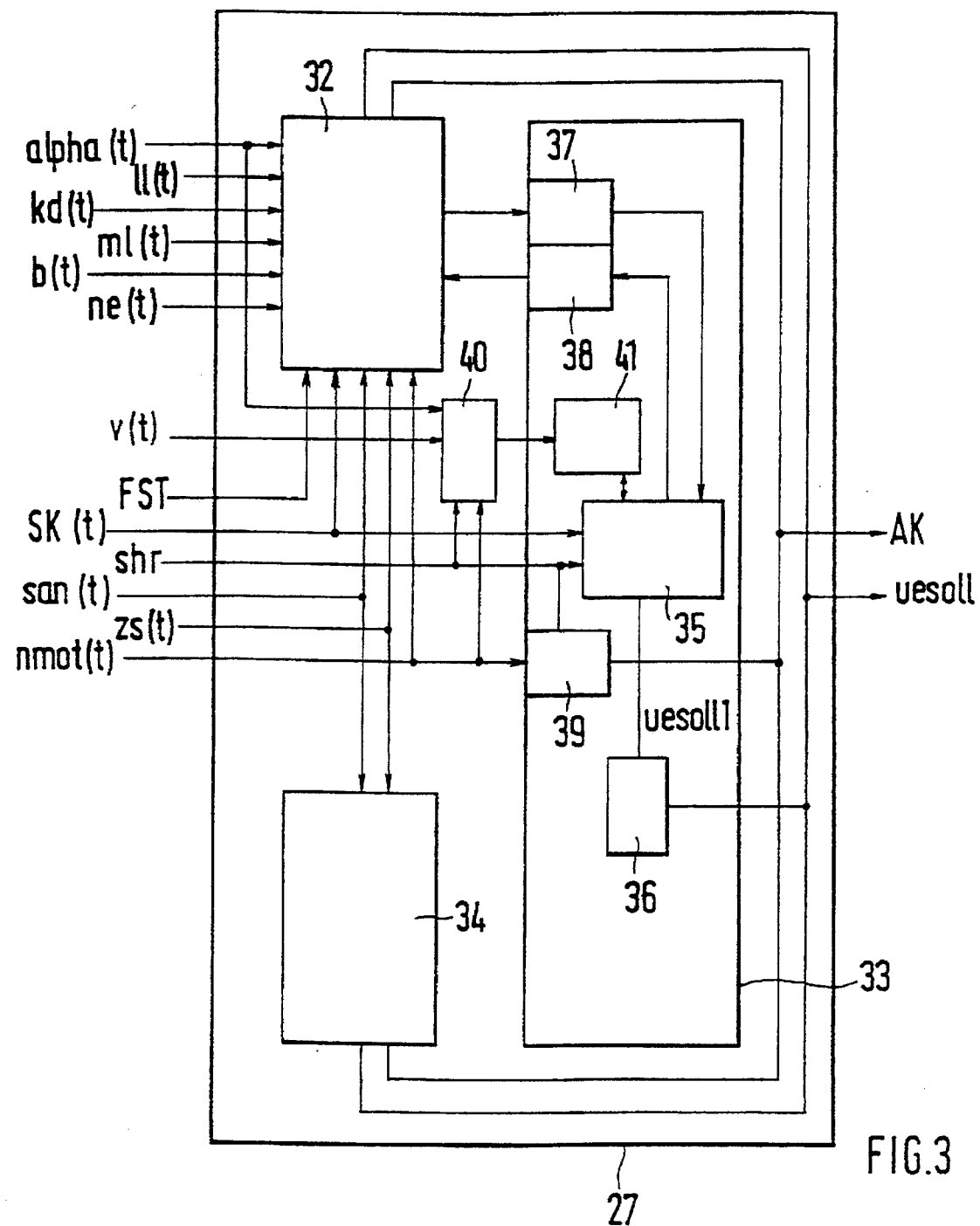
FIG. 3 is a block diagram that illustrates the functions contained in the transmission ratio control.

FIG. 3 is a block diagram of the functions contained in the transmission ratio control 27. For the first operating mode, which automatically selects the transmission ratio, an automatic operation unit 32 receives the input quantities drive/coasting zs(t), wheel slip san(t), driving position signal FST, driving activity SK(t), throttle valve position alpha(t), rotational engine speed nmot(t), idling signal 11 (t), kick-down signal kd(t), air mass signal ml(t), braking signal b(t) and rotational transmission input speed ne(t).

For the second operating mode influenced by the driver, there is a manual operation unit 33 which receives the input quantities shifting request signal shr, driving activity SK(t) and rotational engine speed nmot(t). Furthermore, the transmission ratio control 27 comprises a driving safety unit 34 with the input quantities drive/coasting zs(t) and wheel slip san(t). The above-mentioned units generate the output signals desired transmission ratio $ue_{des}$ and starting clutch disengaged/engaged signal AK, as shown in FIG. 3.

Within the manual operation unit 33, a basic function 35 determines a signal of a first desired transmission ratio $ue_{des1}$ from the driving activity SK(t) and the shifting request signal shr. The basic unit 35 is followed by a wear reduction unit 36 which derives a signal of a desired transmission ratio $ue_{des}$ from the signal of the first desired transmission ratio $ue_{des1}$. A first transition unit 37 and a second transition unit 38, which are each connected with the automatic unit 32, are attached to the basic unit 35. In parallel to the basic unit 35, a safety function 39 is acted upon by the rotational engine speed nmot(t) and emits the shifting request signal shr as well as the starting clutch disengaged/engaged signal AK.

The basic unit 35 contains a look up table (not shown), in which preset desired transmission ratios $ue_{des1}(i)$ are filed. Since, in the simulation of a stepped transmission, each of these preset desired transmission ratios $ue_{des1}(i)$ corresponds to a gear of the stepped transmission, as many preset desired transmission ratios $ue_{des1}(i)$ are provided as there are gears of the stepped transmission to be simulated. The preset desired transmission ratios $ue_{des1}(i)$ may therefore also be called gears.

In the illustrated example, a 5-gear stepped transmission is simulated so that, for forward driving, the preset desired transmission ratios $ue_{des1}(1)$, $ue_{des1}(2)$, $ue_{des1}(3)$, $ue_{des1}(4)$, and $ue_{des1}(5)$ are filed in the table. The naming of the preset desired transmission ratios takes place according to the diagram $ue_{des1}(i)$, i being the corresponding gear of the stepped transmission. $ue_{des1}(3)$ therefore indicates the preset desired transmission ratios which corresponds to the 3rd gear of a stepped transmission. Whereas the gears of $ue_{des1}(1)$ to $ue_{des1}(5)$ become "higher", the value of the preset desired transmission ratio is reduced in this direction: the preset desired transmission ratio is the highest at $ue_{des1}(1)$ and the lowest at $ue_{des1}(5)$.

Finally, an adaptation unit 41 is provided to adjust the desired transmission ratios $ue_{des1}(i)$ filed in the basic unit 35 in a preset manner, whenever the recognition unit 40 detects circumstances which would result in an excessive jump of the transmission ratio.

In the case of a change from the automatic operation unit 32 to the manual operation unit 33 (that is, a change from the first operating mode, which selects the transmission ratio automatically, to the second operating mode manipulated by the driver), the first transition unit 37 controls the transition, while the second transition unit 38 controls the transition from the manual operation unit 33 to the automatic operation unit 32.

The recognition unit 40 recognizes from its input quantities driving speed v(t), throttle valve position alpha(t), rotational engine speed nmot(t) and shifting request signal shr when a driving situation exists in which, at the actual driving speed v(t), the jump to a next lower desired transmission ratio $ue_{des1}(i+1)$ would be too large. In other words, it determines whether in this case, although at the present desired transmission ratio $ue_{des1}$, the motive force utilization is low; at the next lower desired transmission ratio $ue_{des1}(i+1)$, the present speed v(t) can no longer be held because of an insufficient amount of motive force. In order to recognize the desired driving situation, in the case of a shifting request signal shr "downshift", the recognition unit 40 detects the values of the driving speed v(t) and of the throttle valve position alpha(t) which exist immediately before the downshift, and examines the following conditions:

Is the throttle valve position alpha(t) above a limit value g_alpha of approximately 50%?

Is a longitudinal acceleration al(t), which is formed from the driving speed v(t) (or is detected or formed externally)<0?

When such a driving situation is recognized, the recognition unit 40 will activate the adjustment unit 41.

The adjustment unit 41 monitors the rotational engine speed nmot(t) to determine whether it exceeds a limit which is set to maintain a preset margin (that is, a minimum differential rotational speed d_nmot_min) between the current engine speed and the maximum rotational speed nmax of the internal-combustion engine 4. If this condition is also met, the adaptation unit 41 changes the present desired transmission ratio $ue_{des1}(i)$ by transmitting a changed desired transmission ratio $ue_{des2}$ to the basic unit 35 in such a manner that the rotational transmission input speed ne(t) is held to be constant at the present value. If, in this case, the changed desired transmission ratio $ue_{des2}$ becomes approximately as large as the next lower desired transmission ratio $ue_{des1}(i+1)$, a change to the next lower desired transmission, ratio $ue_{des1}(i+1)$ is requested in the basic unit 35.

As soon as one of the three above-mentioned conditions for the throttle valve position alpha(t), the longitudinal acceleration al(t) and the rotational engine speed nmot(t) is no longer satisfied, if the adjustment unit 41 has not yet changed the present desired transmission ratio $ue_{des1}(i)$, the examination of the driving situation by the recognition unit 40 or the monitoring of the rotational engine speed nmot(t) by the adjustment unit 41 is terminated. Also, if the adjustment unit 41 was already activated, it is deactivated again and the now adjusted changed desired transmission ratio $ue_{des2}$ is maintained. A shifting request signal shr, in every case, terminates the operation of both the recognition unit 40 and the adjustment unit 41.

In the case of a shifting request signal shr "downshift", if a changed desired transmission ratio $ue_{des2}$ is already adjusted, a transition takes place to the originally selected desired transmission ratio $ue_{des1}(i)$.

Figure 4:
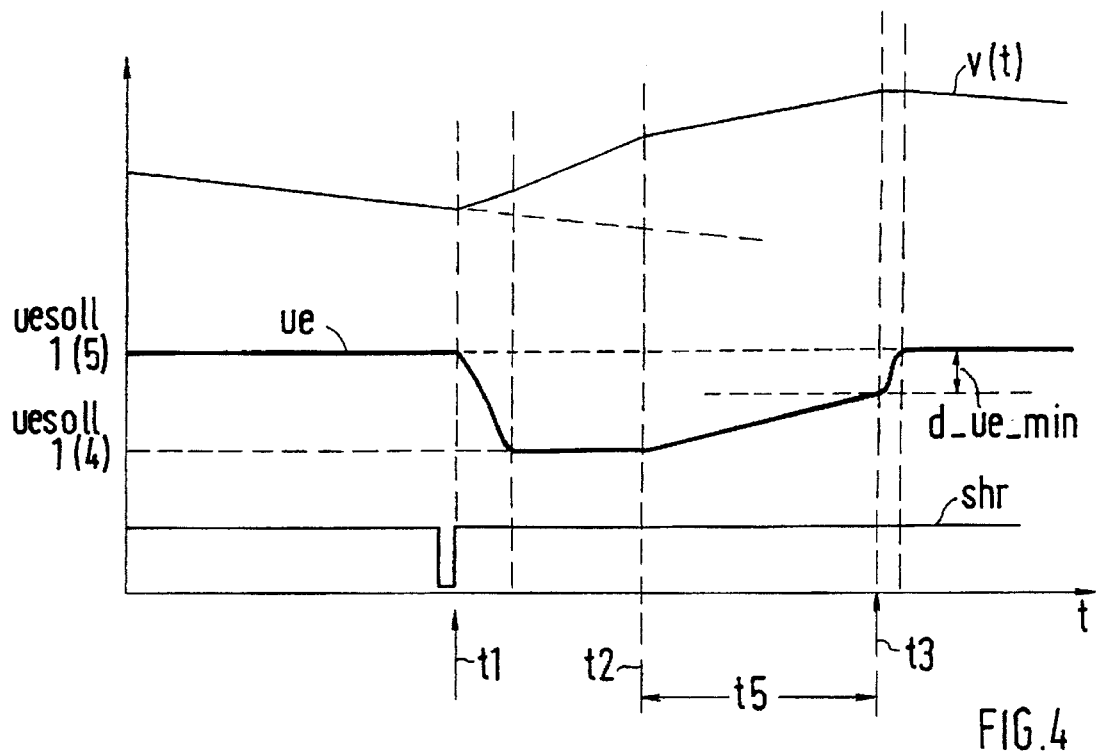
FIG. 4 is a diagram of the adjusted transmission ratio during the operation of the control arrangement according to the invention.
Figure 5:
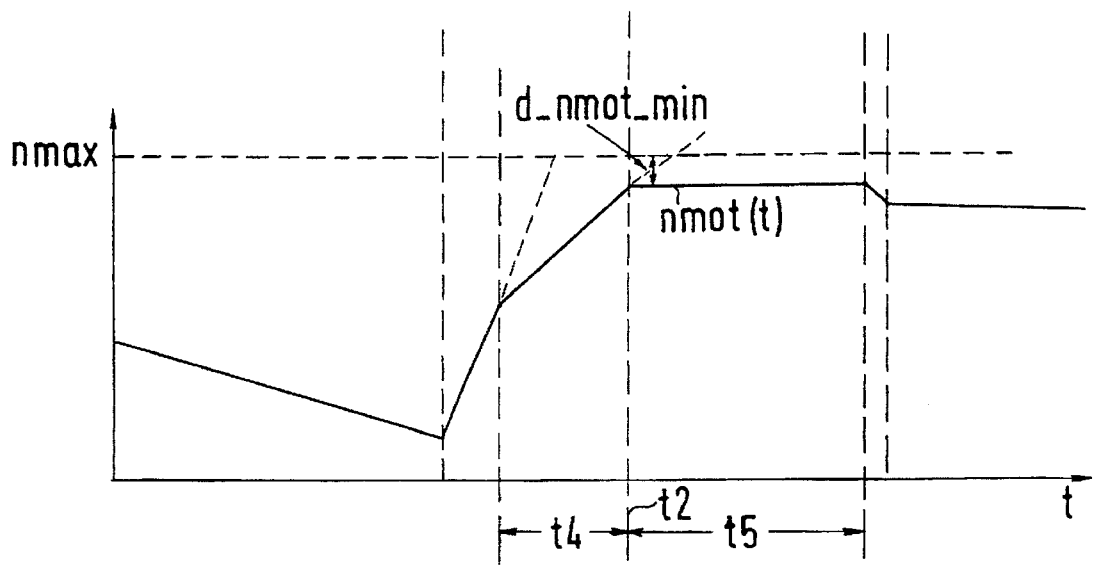
FIG. 5 is a diagram of the time sequence of the rotational speed of a driving engine during the operation of the control arrangement according to the invention.

FIG. 4 shows a diagram of the actual transmission ratio ue during the function of the adjustment unit 41, and FIG. 5 illustrates the simultaneous course of the rotational engine speed nmot(t). Before the point in time t1, the driving speed v(t) drops even though the throttle valve position alpha(t) (not shown) is large; that is, above the limit value g_alpha of approximately 50%. At the point in time t1, a request signal shr "backshift" is emitted. In this case, the recognition unit 40 recognizes the predefined driving situation and releases the adjustment unit 41. After the request signal shr "downshift", the adjusted actual transmission ratio ue is increased from the old value $ue_{des1}(5)$ to the new value $ue_{des1}(4)$ and subsequently the driving speed v(t) and the rotational engine speed nmot(t) will rise. At the point in time t2, the rotational engine speed nmot reaches a value which is less than the maximum rotational speed of the internal-combustion engine 4, by an amount equal to the minimum differential rotational speed d_nmot_min. As of the point in time t2, the adjustment unit 41 becomes operative, and keeps the subsequent rotational transmission input speed ne(t) constant. In this case, the transmission ratio ue continues to be increased according to the changed desired transmission ratio value $ue_{des2}$. At the point in time t3, the transmission ratio ue reaches a value which is less than the desired transmission ratio $ue_{des1}(i+1)$ of the next higher gear, by an amount equal to a minimum transmission ratio difference d_ue_min. An upshift is therefore automatically initiated. After the point in time t3, the adjustment unit 41 is no longer active because, when the upshift takes place, the driving situation recognized by the recognition unit 40 no longer exists.

Figure 6:
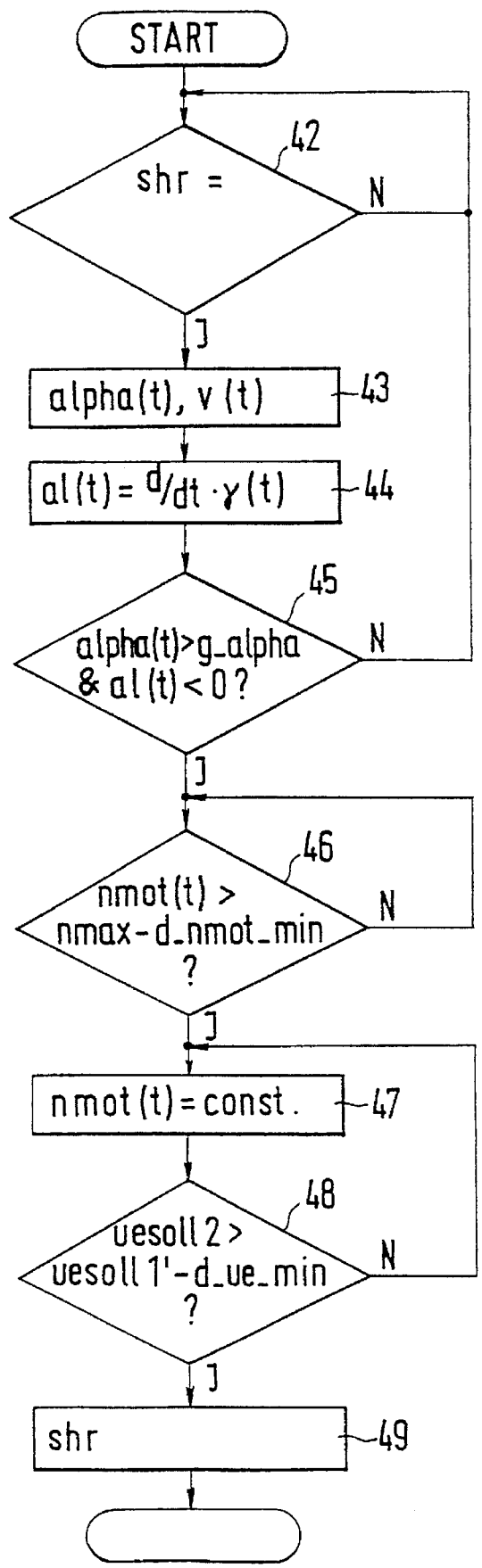
FIG. 6 is a flow chart of a recognition and adaptation function.

In FIGS. 4 and 5, reference number t4 indicates the range in which the actual transmission ratio ue remains constant, and t5 indicates the range in which the rotational transmission input speed ne(t) is kept constant by the effect of the adjustment unit FIG. 6 is a flow chart which shows the manner of operation of the above-described recognition unit 40 and the adjustment unit 41 in an embodiment in which these elements are provided by means of a programmable control unit. The functions of the recognition unit 40 and of the adjustment unit 41, which up to now have been shown separately, are illustrated together.

First, a shifting request signal shr "downshift" is awaited in step 42. After a downshift is recognized, the throttle valve position alpha(t) and the driving speed v(t) are determined immediately before the shifting, in step 43. In step 44, the longitudinal acceleration al(t) is formed from the driving speed v(f), and in step 45 it is subsequently determined whether (i) the longitudinal acceleration al(t) is smaller than zero, and (ii) the throttle valve position alpha(t) is larger than a limit value g_alpha. If these conditions are not both met, processing returns to step 42. If, however, both of these conditions are met, in step 46 it is determined whether the rotational engine speed nmot(t) exceeds a value equal to the maximum'rotational engine speed nmax minus the minimum differential rotational speed d_nmot_min. If so, in step 47, the rotational engine speed nmot is maintained constant at the existing value until it is recognized in step 48 that the adjusted actual transmission ratio ue is closer than a minimum differential value due min to the desired transmission ratio in the next higher gear $ue_{des1}(i+1)$. When the latter circumstances occurs, in step 49, a shifting request signal shr "upshift" is emitted, and the program is terminated.

The program is terminated at any point in time after step 42 if another shifting request signal shr is recognized. In the diagram according to FIG. 6, steps 42 to 46 correspond to the recognition unit 40 and steps 47 to 49 correspond to the adjustment unit 41.

The transmission ratio control unit 27 (FIGS. 2, 3) operates as follows: before the operation is started, groups of preset transmission ratios $ue_{des1}(1 \ldots 5)$ are stored in a memory (not shown). During operation, either by means of the automatic operation unit 32 or the manual operation unit 33, the preset transmission ratios $ue_{des1}(i)$ are selected and are adjusted at the transmission 2 by means of the adjusting unit 31. When the recognition unit 40 now recognizes (as described above) that, before the request of a downshift, despite a high throttle valve position alpha(t), the driving speed v(t) cannot be maintained, and in addition, after the downshift, the internal-combustion engine 4 reaches the proximity of its maximum rotational speed nmax, the recognition unit 40 will activate the adjustment unit 41 which changes the present desired transmission ratio $ue_{des1}(4)$, so that the rotational engine speed nmot(t) is kept constant. This adjustment continues until either the presently adjusted actual transmission ratio ue or the changed desired transmission ratio $ue_{des2}$ is so close to the next lower transmission ratio $ue_{des1}(5)$ that an automatic upshift is carried out in order to maintain the stepped character, or the throttle valve position alpha(t) falls under the limit value g_alpha. Subsequently, the adjusted actual transmission ratio ue or the change desired transmission ratio $ue_{des2}$ is maintained.

If a shifting request signal shr "downshift", occurs now, the desired transmission ratio $ue_{des1}(4)$ which had been selected before the intervention by the adjustment unit 41, is adjusted again.

As mentioned above, the recognition unit 40 and the adjustment unit 41 (as well as the process steps performed by these units in a programmable control system) can be used with both automatically shifted transmissions and transmissions shifted by the driver. In a further embodiment, which is not shown in detail, it is therefore naturally provided that the automatic operation unit 32 simulates a stepped automatic device. In this case, a recognition unit 40 and an adjustment unit 41 are provided within the automatic unit 35 in an analogous manner.

Although the invention has been described and illustrated in detail, it is to be clearly understood that the same is byway of illustration and example, and is not to be taken by way of limitation. The spirit and scope of the present invention are to be limited only by the terms of the appended claims.

What is claimed is:

1. Apparatus for controlling a continuously variable transmission of a motor vehicle driven by an internal-combustion engine having a selecting device which simulates a stepped transmission by adjusting ratios in the transmission in accordance with a group of preset transmission ratios, said apparatus comprising:

a recognition unit for detecting driving situations in which a transmission ratio shift from a currently selected first preset transmission ratio to a second preset transmission ratio would result in a transmission ratio which provides a motive force that is insufficient to overcome an existing motive resistance of said vehicle; and an adjustment unit activated by an output of said recognition unit, which changes one of the currently selected first preset transmission ratio and the second preset transmission ratio, such that said motive force is adapted to an existing motive resistance.

2. Apparatus according to claim 1 wherein the recognition unit generates an output when, before a change from a preset transmission ratio to a next higher preset transmission ratio, a throttle valve position is larger than a limit value and a longitudinal acceleration is smaller than zero.

3. Apparatus according to claim 1 wherein the adjustment unit adjusts a changed transmission ratio such that a rotational transmission input speed remains constant when a rotational engine speed is higher than a limit value.

4. Apparatus according to claim 3 wherein an automatic change to the next lower preset transmission ratio takes place as soon as the rotational engine speed at the next lower preset transmission ratio falls below a given rotational speed difference.

5. Apparatus according to claim 3 wherein an automatic change to the next lower preset transmission ratio takes place as soon as a reserve of motive force is detected in the case of the presently existing throttle valve position and rotational engine speed.

6. Apparatus according to claim 1 wherein the adjustment unit replaces a next higher transmission ratio with a changed transmission ratio which is selected to provide a preset rotational engine speed margin, which permits operation of the internal-combustion engine.

7. Apparatus according to claim 6 wherein said rotational engine speed margin provides a reserve of motive force.

8. Apparatus according to claim 1 wherein the recognition unit will respond even when the presently existing throttle valve position and rotational engine speed provide no motive force reserve at a next lower preset transmission ratio.

9. Apparatus according to claim 1 wherein:
the adjustment unit suppresses a change to a next lower preset transmission ratio until a motive force reserve exists at current throttle valve position and rotational engine speed; and
during such suppression, the adjustment unit adjusts a changed transmission ratio such that rotational transmission input speed remains constant when a rotational engine speed is higher than a limit value.

10. Apparatus according to claim 1 wherein the adjustment unit replaces a next lower preset transmission ratio with a changed transmission ratio which is selected to provide a motive force reserve at current throttle valve position and rotational engine speed.

11. Apparatus according to claim 1 wherein after deactivation, the adjustment unit retains a last adjusted changed transmission ratio until a next shifting, in the case of a downshift, the originally adjusted transmission ratio being adjusted again.

12. Process for controlling a continuously variable transmission of a motor vehicle driven by an internal-combustion engine, by means of a control arrangement provided with a selecting device which simulates a stepped transmission by adjusting ratios in the transmission in accordance with a group of preset transmission ratios, said process comprising the steps of:
detecting a driving situation in which a transmission ratio shift from a currently selected first preset transmission ratio to a second preset transmission ratio would result in a transmission ratio which provides a motive force that is insufficient to overcome an existing motive resistance of said vehicle; and
adjusting one of the currently selected first preset transmission ratio and the second preset transmission ratio, such that said motive force at this selected transmission ratio corresponds to an existing motive resistance.

13. Process according to claim 12 wherein said detecting step comprises:
awaiting a shifting request signal "downshift":
determining throttle valve position and longitudinal acceleration immediately before a downshift is performed;
determining whether the longitudinal acceleration is less than zero, and whether the throttle valve position is larger than a limit value; and
continuing the adjustment of the selected transmission ratio, so long as said longitudinal acceleration remains less than zero, while the throttle valve position remains larger than said limit.

14. Process according to claim 12 wherein the step of adjusting the selected transmission ratio comprises:
waiting until rotational engine speed exceeds a limit value; and
subsequently adjusting a changed transmission ratio so that the rotational transmission input speed is kept constant.

15. Process according to claim 14 comprising the additional steps of:
examining whether the changed transmission ratio is larger than a limit value; and
if so, emitting a shifting request signal "upshift".

16. Process according to claim 14 comprising the additional steps of:
examining whether, at a next lowest transmission ratio, an operation of the internal-combustion engine is possible at current throttle valve position and rotational engine speed, with a reserve of motive force; and
if so, emitting of a shifting request signal "upshift".

17. Process according to claim 12 wherein the step of adjusting the selected transmission ratio comprises:
adjusting a changed next higher transmission ratio such that the internal-combustion engine can be operated there with a given rotational speed margin.

18. Process according to claim 12 wherein the step of adjusting a changed next higher transmission ratio comprises:
adjusting a changed next higher transmission ratio so that the internal-combustion engine can be operated there with a given rotational speed margin and with a reserve of motive force.

19. Process according to claim 12 wherein said detecting step comprises:
examining whether a reserve of motive force exists at a next lower preset transmission ratio at current throttle valve position and rotational engine speed; and
if so, then adjustment to the selected transmission ratio.

20. Process according to claim 12 wherein the steps of adjusting the selected transmission ratio comprises:
examining whether a reserve of motive force exists at a next lower preset transmission ratio at current throttle valve position and rotational engine speed; and
as long as the result is "no", suppressing a change to a next lower preset transmission ratio; and
adjusting a changed transmission ratio so that a rotational transmission input speed remains constant when a rotational engine speed is higher than a limit value.

21. Process according to claim 12 wherein the step of adjusting the selected transmission ratio comprises:
adjusting a changed next lower transmission ratio so that a motive force reserve exists at current throttle valve position and rotational engine speed.

22. Process according to claim 12 wherein the control process is terminated at any point in time after awaiting the shifting request signal "downshift" when another shifting request signal is recognized.

* * * * *